United States Patent
Uehara et al.

(10) Patent No.: US 11,211,099 B2
(45) Date of Patent: Dec. 28, 2021

(54) DISK DEVICE WITH WIRING BOARD ON OUTER SURFACE OF HOUSING AND CONNECTED TO MOTOR AND SEALING CONFIGURATION

(71) Applicants: Kabushiki Kaisha Toshiba, Tokyo (JP); Toshiba Electronic Devices & Storage Corporation, Tokyo (JP)

(72) Inventors: Manabu Uehara, Kawasaki Kanagawa (JP); Yuu Kawai, Shinagawa Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/016,878

(22) Filed: Sep. 10, 2020

(65) Prior Publication Data

US 2021/0272603 A1    Sep. 2, 2021

(30) Foreign Application Priority Data

Feb. 27, 2020 (JP) .............................. JP2020-031684
Jul. 13, 2020 (JP) .............................. JP2020-119893

(51) Int. Cl.

| | | |
|---|---|---|
| G11B 33/14 | (2006.01) | |
| G11B 33/12 | (2006.01) | |
| G11B 19/20 | (2006.01) | |
| G11B 5/48 | (2006.01) | |
| G11B 33/04 | (2006.01) | |

(52) U.S. Cl.
CPC ...... *G11B 33/1446* (2013.01); *G11B 19/2009* (2013.01); *G11B 33/122* (2013.01); *G11B 5/4813* (2013.01); *G11B 33/0472* (2013.01); *G11B 33/126* (2013.01); *G11B 33/128* (2013.01)

(58) Field of Classification Search
None
See application file for complete search history.

(56) References Cited

U.S. PATENT DOCUMENTS

| | | | |
|---|---|---|---|
| 5,815,345 A | 9/1998 | Pelstring et al. | |
| 5,942,820 A * | 8/1999 | Yoshida | G11B 19/2009 360/99.08 |
| 7,684,146 B1 * | 3/2010 | Andrikowich et al. | G11B 33/1466 360/99.21 |
| 8,879,204 B2 | 11/2014 | Sekii et al. | |
| 2009/0195095 A1 * | 8/2009 | Yawata et al. | H02K 5/225 310/71 |

(Continued)

FOREIGN PATENT DOCUMENTS

JP    2011-81891 A    4/2011

*Primary Examiner* — Craig A. Renner
(74) *Attorney, Agent, or Firm* — Allen & Overy LLP (57) ABSTRACT

According to one embodiment, a disk device includes a housing with a bottom wall, magnetic disks supported on a hub of a motor, a printed circuit board provided on an outer surface of the bottom wall, and a wiring board attached on the outer surface of the bottom wall. The bottom wall includes a recess formed in the outer surface, a step located on border between the outer surface and the recess, and through holes opened to the recess. The wiring board includes one end portion disposed in the recess and connection pads on the one end portion, connected to lead wires of a coil. An adhesive is filled into the recess and the through holes, and covers the one end and a solder joint and seals the through holes.

9 Claims, 4 Drawing Sheets

(56) References Cited

U.S. PATENT DOCUMENTS

| | | | |
|---|---|---|---|
| 2010/0231068 A1* | 9/2010 | Yamazaki et al. | G11B 19/2036 310/71 |
| 2010/0329104 A1* | 12/2010 | Yawata et al. | H02K 5/225 310/71 |
| 2011/0216442 A1* | 9/2011 | Uchibori et al. | G11B 17/02 360/99.08 |
| 2012/0182645 A1* | 7/2012 | Kurokawa et al. | G11B 19/2009 360/99.08 |
| 2013/0113314 A1* | 5/2013 | Lim | G11B 19/2009 310/71 |
| 2013/0154409 A1 | 6/2013 | Yamada et al. | |
| 2015/0022919 A1* | 1/2015 | Matsuyama et al. | G11B 19/2009 360/99.08 |
| 2015/0036475 A1* | 2/2015 | Shiraishi et al. | G11B 19/2009 310/71 |
| 2016/0078894 A1* | 3/2016 | Park | G11B 19/2009 360/99.08 |
| 2016/0164364 A1* | 6/2016 | Yoneda et al. | H02K 5/225 310/71 |
| 2016/0164365 A1* | 6/2016 | Yoneda et al. | H02K 5/22 310/71 |
| 2016/0190875 A1* | 6/2016 | Takemoto et al. | G11B 19/2009 360/99.08 |
| 2017/0353076 A1* | 12/2017 | Ito et al. | H02K 5/225 |
| 2018/0322909 A1 | 11/2018 | Kaneko et al. | |
| 2018/0336926 A1* | 11/2018 | Suginobu | G11B 19/2009 |
| 2019/0096443 A1 | 3/2019 | Yamada | |
| 2020/0105299 A1* | 4/2020 | Showa et al. | G11B 19/2009 |
| 2020/0143832 A1* | 5/2020 | Hanzel et al. | G11B 19/2036 |

* cited by examiner

DISK DEVICE WITH WIRING BOARD ON OUTER SURFACE OF HOUSING AND CONNECTED TO MOTOR AND SEALING CONFIGURATION

CROSS-REFERENCE TO RELATED APPLICATIONS

This application is based upon and claims the benefit of priority from Japanese Patent Applications No. 2020-031684, filed Feb. 27, 2020; and No. 2020-119893, filed Jul. 13, 2020, the entire contents of all of which are incorporated herein by reference.

FIELD

Embodiments described herein relate generally to a disk device.

BACKGROUND

As a disk drive, for example, a hard disk drive (HDD) comprises a plurality of magnetic disks disposed rotatably in a housing, a plurality of magnetic heads which carry out read or write of data from/to a magnetic disk, and a head actuator movably supporting the magnetic heads with respect to the respective magnetic disks. A spindle motor is installed on a bottom wall of the housing, and magnetic disks are mounted to a cylindrical hub of the spindle motor.

Recently, such a housing is air-tightly constructed, and a low-density gas such of helium or the like is enclosed in the housing. Further, in order to increase the storage capacity, there have been attempts to load more magnetic disks in the housing.

In order for such disk drives as described above to be able to sustain the sealing of a low-density gas for a long term, a high cast-quality housing with only few casting cavities, which may give rise to leak paths, is required. In order to improve the fluidity of the molten material while casting, the thickness of at least about 1 mm is necessary for the cast product. Further, in order to avoid the hub of the motor rotating at high speed from being brought into contact with the bottom wall of the housing, a predetermined gap needs to be provided between the flange of the hub and the bottom wall. However, there necessary items can be an obstacle in the attempt to increase the number of disks to be mounted or to expand the intervals between disks.

DETAILED DESCRIPTION

Various embodiments will be described hereinafter with reference to the accompanying drawings. In general, according to one embodiment, a disk device comprises a housing comprising a base including a bottom wall and a cover fixed to the base; a motor comprising a shaft provided on the bottom wall, a hub including an outer circumferential surface coaxial with the shaft and an annular flange provided on the outer circumferential surface, and rotatably supported on the shaft, and a coil provided around the shaft; a plurality of magnetic disks attached to the hub to overlap the flange; a head actuator supporting a plurality of magnetic heads and installed rotatably in the housing; a printed circuit board disposed to oppose an outer surface of the bottom wall; and a wiring board attached on the outer surface of the bottom wall and electrically connected to the printed circuit board and the coil. The bottom wall includes a recess formed in the outer surface to oppose a region between an inner circumferential edge of the flange and the shaft, a step located on a border between the outer surface and the recess, and through holes each formed to penetrate the bottom wall and opened to the recess. The wiring board includes one end portion disposed in the recess and a plurality of connection pads provided on the one end portion, the coil includes lead wires drawn out in the recess via the through holes, and joined to the connection pads by soldering, and an adhesive is filled into the recess and the through holes, covering the one end and a solder joint, and sealing the through holes.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

As a disk device, a hard disk drive (HDD) of a first embodiment will be described in detail.

Figure 1:
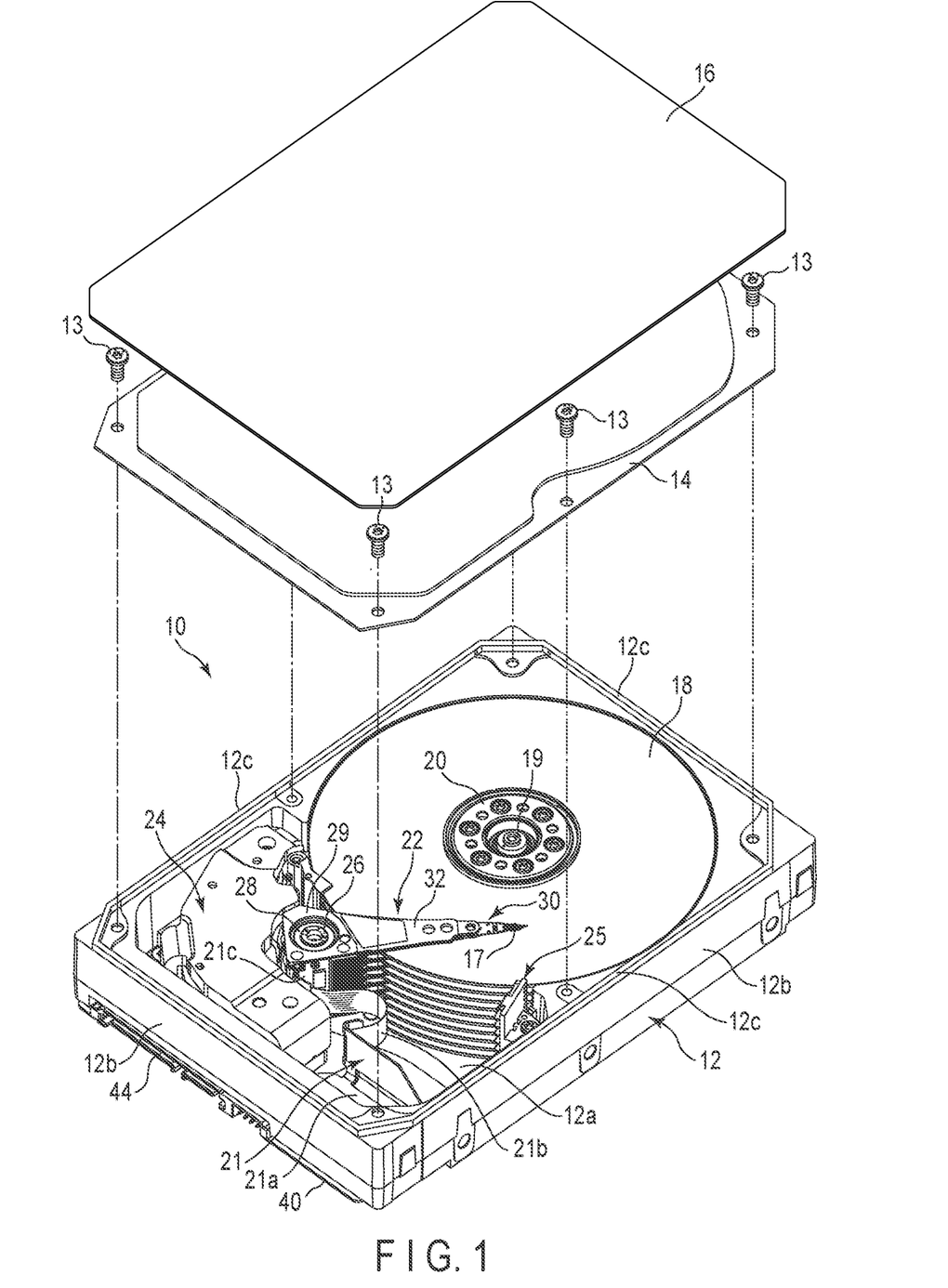
FIG. 1 is an exploded perspective view of a hard disk drive (HDD) according to the first embodiment when the top cover is removed.

FIG. 1 is an exploded perspective view of a hard disk drive (HDD) according to the first embodiment when the top cover is removed.

As shown, the HDD comprises substantially a rectangular-shaped housing 10. The housing 10 includes a rectangular box-shaped base 12 whose upper surface is opened, an inner cover 14 screwed to the base 12 with a plurality of screws 13 and closing an upper edge opening of the base 12 and an outer cover (a top cover) 16 disposed to be overlaid on the inner cover 14, whose circumferential portion is welded to the base 12. The base 12 includes a rectangular-shape bottom wall 12a opposing the inner cover 14 with a gap therebetween and a side wall 12b provided to stand along the circumference of the bottom wall 12a, formed to be integrated as one body, for example, aluminum alloy. The side wall 12b includes a pair of long side walls opposing each other and a pair of short side walls opposing each other. On an upper end surface of the side wall 12b, a substantially rectangular frame-shaped fixation rib 12c is provided to project therefrom.

The inner cover 14 is formed, for example, of stainless steel into a rectangular plate shape. The inner cover 14 is fixed inside the fixation rib 12c by screwing the circumferential portion of the cover to the upper end surface of the side wall 12b with screws 13. The outer cover 16 is formed, for example, of aluminum into a rectangular plate shape. The outer cover 16 has planer dimensions slightly greater than those of the inner cover 14. The circumferential portion of the outer cover 16 is welded to the fixation rib 12c of the base 12 over the entire circumference, and thus airtightly fixed to the base 12.

Note that the housing 10 is formed to have a height (thickness) H of 26.1 mm at the maximum or less (see FIG. 4) according to the 3.5-inch HDD standard.

In the housing 10, a plurality of, for example, ten magnetic disk 18 as discoidal recording media and a spindle motor 19 as a drive motor, which rotate the magnetic disks 18 are provided. The spindle motor 19 is disposed on the bottom wall 12a. Each of the magnetic disks 18 is formed into, for example, a disk having a diameter of 96 mm (3.5 inches) and a thickness of 0.5 to 0.635 mm, and comprises a substrate formed of, for example, a nonmagnetic material such as glass or aluminum and magnetic recording layers respectively formed on an upper surface (a first surface) and a lower surface (a second surface) of the substrate. In the embodiment, an aluminum substrate is employed. The magnetic disks 18 each are fit with a hub, which will be described later, of the spindle motor 19 so as to be coaxial with each other and further clamped by a clamp spring 20. Thus, the magnetic disk 18 is supported to be located parallel to the bottom wall 12a of the base 12. The magnetic disks 18 are rotated at a predetermined number of revolutions by the spindle motor 19. Note that the number of magnetic disks 18 loaded may not necessarily be 10, but may be eleven or more.

In the housing 10 are provided a plurality of magnetic heads 17 which record and reproduce data with respect to the respective magnetic disks 18, and an actuator assembly 22 supporting the magnetic heads 17 to be movable relative to the respective magnetic disks 18. Further, in the housing 10 are provided a voice coil motor (VCM) 24 which pivots and positions the actuator assembly 22, a ramp load mechanism 25 which maintains, when a magnetic head 17 moves to an outermost circumference of the respective magnetic disk 18, the magnetic head 17 at an unload position spaced from the magnetic disk 18, and a flexible printed circuit unit (FPC unit) 21 on which electronic components such as conversion connectors and the like are mounted.

The actuator assembly 22 comprises an actuator block 29 with a through hole, a bearing unit (unit bearing) 28 provided in the through hole, a plurality of, for example, eleven arms 32 extending from the actuator block 29, a suspension assembly (a head gimbal assembly, which may be referred to as HGA) 30 attached to each arm 32 and the magnetic head 17 supported on the suspension assembly 30. With the bearing unit 28, the actuator block 29 is supported rotatably around the support shaft 26 provided to stand on the bottom wall 12a.

The FPC unit 21 incudes substantially rectangular-shaped base portion 21a bent into an L shape, a slim strip shaped relay portion 21b extending from one side edge of the base portion 21a and a joint portion provided to continuous to a distal end of the relay portion 21b, which are all integrated into one body. The base portion 21a, the relay portion 21b and the joint portion 21c constitute the flexible printed circuit board (FPC).

On the base portion 21a, electronic components such as conversion connectors, which will be described later, a plurality of capacitors and the like are mounted and are electrically connected to the wiring of the FPC. On the base portion 21a, a metal plate functioning as a reinforcement plate is attached. The base portion 21a is disposed on the bottom wall 12a of the base 12. The relay portion 21b extends from a side edge of the base portion 21a towards the actuator block 29 of the actuator assembly 22. The joint portion 21c, provided in an extending end of the relay portion 21b, is attached to a side surface (installation surface) of the actuator block 29 and fixed with screws. A large number of connection pads are provided in the joint portion 21c. Each of the magnetic heads 17 of the actuator assembly 22 is electrically connected to a respective connection pad of the joint portion 21c via a wiring member.

Figure 2:
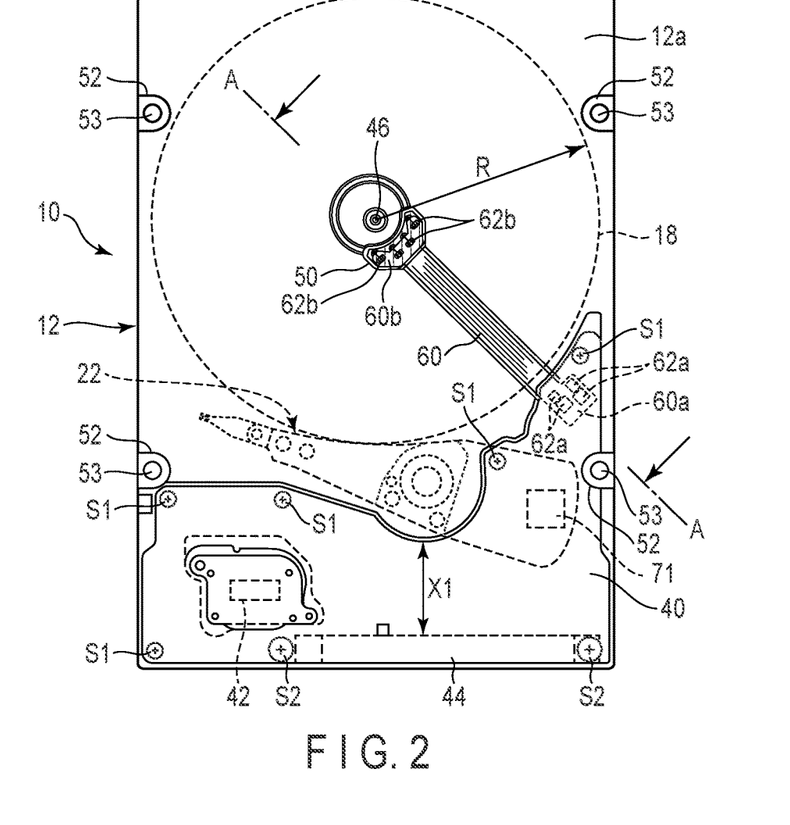
FIG. 2 is a plan view of a rear surface of the HDD.
Figure 3:
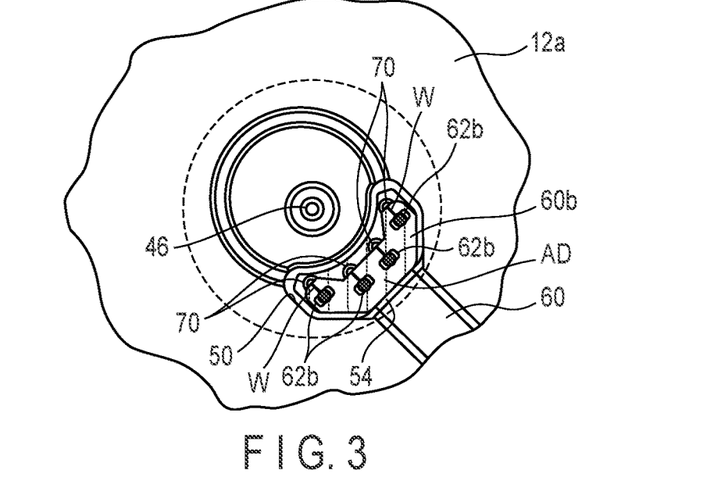
FIG. 3 is a partially enlarged plan view showing a motor connection portion shown in FIG. 2.

FIG. 2 is a plan view showing the HDD from a rear surface side and FIG. 3 is an enlarged plan view of a motor joint portion in FIG. 2.

As seen in FIG. 2, a printed circuit board 40 is disposed on an outer surface of the bottom wall 12a of the base 12, and fixed to the bottom wall 12a with a plurality of screws S1 and S2. In this embodiment, the printed circuit board 40 is formed into a size of about ¼ to ⅓ of the area of the bottom wall 12a and is located in a location which does not overlap a region opposing the magnetic disks 18 and a region opposing an area where the actuator assembly 22 is movable, that is, a location in the outer surface of the bottom wall 12a, which is off from these regions. In the embodiment, the printed circuit board 40 is provided in a region opposing one end of the bottom wall 12a, where the VCM 24 and FPC unit 21 are provided. Further, in the embodiment, a recess with a shape corresponding to the printed circuit board 40 is formed in the outer surface of the bottom wall 12a. This recess has a depth corresponding to the thickness of the printed circuit board 40 including the mounted electronic components, and the printed circuit board 40 is disposed in the recess to be overlaid thereon.

On the printed circuit board 40, a relay connector 42 connected to a connecter of the FPC unit 21, an interface connector 44 to be connected to an external equipment, a motor drive IC 71 and other electronic components (not shown) are mounted. The printed circuit board 40 is configured as a controlling unit to control operation of the spindle motor 19 and control operation of the VCM 24 and the magnetic heads 17 via the FPC unit 21.

As seen in FIG. 2, the printed circuit board 40 is formed into such a shape that avoids the region opposing the magnetic disks and the actuator movable region, which is a shape with a constricted portion having a width Xl. In the constriction portion, the wiring for I/F signals, DRAM signals, VCM signals and various power sources need to be passed. Therefore, in the embodiment, the printed circuit board 40 is configured as, for example, a six-layered printed circuit board, in which the wiring for the I/F signals is formed on a surface layer of the board, the wiring for the DRAM signal and the wiring for the power sources are formed in an inner layer of the board and the wiring for the VCM is formed on a rear layer of the board, thus realizing the above-described wiring.

Further, in the printed circuit board 40, the portion of the board, which is close to the location where the motor drive IC 71 is mounted, is formed into a relatively slim shape, and with this structure, there is a possibility that the circuit board greatly warps due to the repulsion force by the IC heat radiation sheet. Therefore, in the embodiment, the printed circuit board 40 is formed to have a thickness of, for example, 0.8 mm, so as to increase the rigidity of the board. Further, the screw S1 is added to a location near the motor drive IC 71, thereby preventing the warping of the board.

At a plurality of points on the outer surface of the bottom wall 12a, for example, two locations of side edge portions on each long side edge, bosses 52 of a predetermined height are provided to project. A screw hole 53 for fixing the HDD is formed in each of the bosses 52.

The four bosses 52 are processed plainly so that upper surfaces thereof (user tap surfaces) are located in the same plane.

The HDD is installed so that the upper surfaces of the four bosses 52 are brought into contact with the installation surface. That is, the upper surfaces of the bosses 52 are a lowermost surface ML of the base 12.

As shown in FIGS. 2 and 3, a shaft 46 of the spindle motor 19 is provided to stand on the bottom wall 12a. A proximal end of the shaft 46 is fit with the through hole formed to penetrate the bottom wall 12a. In an outer surface of the bottom wall 12a, a recess 50 of a predetermined shape, which will be described later, is formed around the shaft 46. The recess 50 is recessed by a predetermined depth from the outer surface, and thus a step portion 54 is formed in a border between the outer surface of the bottom wall 12a and the recess 50.

A strip-shaped flexible printed circuit board (FPC) 60 is attached and fixed as a wiring member on the outer surface of the bottom wall 12a. The FPC 60 includes a base insulating layer of polyimide or the like, a conducting layer formed on the base insulating layer, which constitutes a plurality of wires, contact pads and the like, and a protective layer which covers the conducting layer. The FPC 60 extends from the printed circuit board 40 to the vicinity of the shaft 46 in a diametrical direction of the magnetic disk 18. The FPC 60 includes a first end portion 60a located between the printed circuit board 40 and the outer surface of the bottom wall 12a, a second end portion 60b disposed in the recess 50, a plurality of, for example, four first contact pads 62a provided in the first end portion 60a and a plurality of, for example, four second contact pads 62b provided in the second end portion 60b. The first contact pads 62a and the second contact pads 62b are electrically connected to each other via the wiring of the FPC 60.

The first end portion 60a and the first contact pads 62a are placed in positions further outer side from an outer circumference of the respective magnetic disk 18. The first contact pads 62a is joined to the printed circuit board 40 by soldering to be electrically connected to the printed circuit board 40. As will be discussed later, to the second contact pads 62b, a lead wire W drawn out from a coil of the spindle motor 19 is joined by soldering. Further, an adhesive AD is filled into the recess 50 so as to cover the second end portion 60b and the solder joint.

Figure 4:
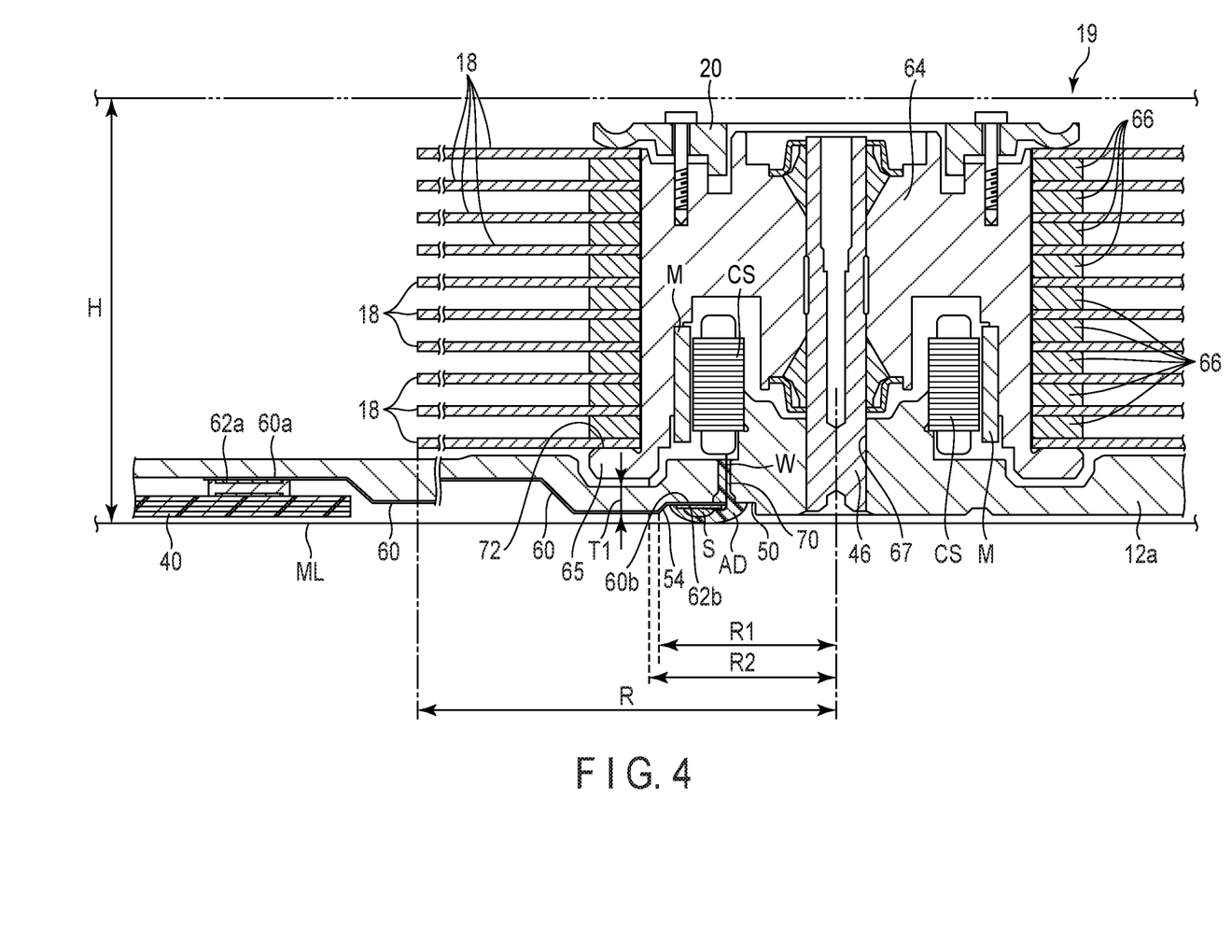
FIG. 4 is a cross section of the HDD taken along line A-A in FIG. 2.

FIG. 4 is a cross section of the HDD taken along line A-A of FIG. 2. In FIG. 4, a straight line ML indicates the lowermost surface of the base 12. As described above, the maximum height H of the housing 10, that is, the height H between the lowermost surface ML and the upper surface of the outer cover (the top cover) 16 is set to the maximum height of 26.1 mm or less according to the 3.5-inch HDD standard.

As shown, the spindle motor 19 includes, for example, the shaft 46 provided to stand substantially perpendicular on the bottom wall 12a, a substantially cylindrical spindle hub 64 rotatably supported around the shaft 46, a stator coil CS fixed to the bottom wall 12a and disposed around the shaft 46 and a cylindrical magnet M attached to an inner peripheral surface of the spindle hub 64 and opposing the stator coil CS.

The proximal end of the shaft 46 is inserted to and fit with the through hole 67 formed in the bottom wall 12a.

The spindle hub 64 includes an outer circumferential surface located coaxial with the shaft 46 and an annular flange 65 formed to be integrated with a lower end (on a bottom wall 12a side) of the outer circumferential surface. The flange 65 includes an annular disk mounting surface 72 on which a respective magnetic disk 18 is placed. The lower end of the spindle hub 64 and the flange 65 opposes the inner surface of the bottom wall 12a with a gap of, for example, about 0.4 mm therebetween.

The magnetic disks 18 are engaged with the outer circumferential surface of the spindle hub 64 while the spindle hub 64 penetrates through the inner holes thereof. Further, annular spacer rings 66 are mounted on the outer circumferential surface of the spindle hub 64 so that each is interposed between each adjacent pair of magnetic disks 18. The magnetic disks 18 and the spacer rings 66 are disposed to the on the flange 65 of the spindle hub 64 in order while alternately attached to the spindle hub 64 to be stacked one on another. Inner circumferential portions of the magnetic disks 18 and the spacer ring 66 are pushed to a flange 65 side by a clamp spring 20 attached to an upper end of the spindle hub 64. Thus, the ten magnetic disks 18 are fixed to the spindle hub 64 with regular intervals between each other in a stacked layer state, and they are supported integrally with the spindle hub 64 as one body so as to be rotatable. The ten magnetic disks 18 are supported at regular intervals, parallel to each other and further substantially parallel to the bottom wall 12a.

As shown in FIGS. 3 and 4, in the outer surface of the bottom wall 12a, an arc-shaped recess 50 is formed in a region around the shaft 46. In this embodiment, the recess 50 is provided in a region opposing the stator coil CS. The step (slope) 54 is provided in the border between the recess 50 and the outer surface of the bottom wall 12a. In this embodiment, when a radius from a central axis of the shaft 46 to an inner circumferential-side edge of the flange 65 is represented by R2 (for example, 12.07 mm), the step 54 is provided in a radial position of radius R1 which is less than the radius R2. That is, the step 54 and the recess 50 are provided in a radial region smaller than the inner circumferential-side edge of the flange 65, that is, a range between the inner circumferential-side edge of the flange 65 and the shaft 46.

The height of the step 54 (=the depth of the recess 50) is set to, for example, 0.6 mm. In this embodiment, the step 54 is formed as a slope inclined by approximately 45 degrees to a direction perpendicular to the outer surface of the bottom wall 12a.

A plurality of, for example, four through holes 70 are formed at locations opposing the stator coil CS of the bottom wall 12a. The four through holes 70 each penetrate the bottom wall 12a and are opened in a bottom surface of the recess 50. The lead wires W drawn out from the stator coil CS is drawn out to the recess 50 via the through holes 70.

A second end portion 60b of the FPC 60 attached to the outer surface of the bottom wall 12a extends into the recess 50 via the step (slope) 54 and is attached to the step 54 and the bottom surface of the recess 50. The lead wires W are joined by soldering to four second connection pads 62b of the second end portion 60b with a solder S, respectively. Thus, the stator coil CS is electrically connected to the printed circuit board 40 via the FPC 60.

Further, the adhesive AD is filled into the recess 50 and the through holes 70. The adhesive AD covers the second end portion 60b, the solder joint and the lead wires W and airtightly seals each of the through holes 70. Here, the step 54 prevents spreading of the adhesive AD to the outside and thus the adhesive AD is filled and placed only in the recess 50. The adhesive AD is provided in the recess 50, and therefore a bulging portion of the adhesive AD is contained lower than the lowermost surface without overflowing the lowermost surface ML of the base 12.

Thus, it is no longer necessary to consider the bulging portion of the adhesive AD in a region opposing the flange 65, and therefore it suffices if the height of the outer surface of the bottom wall 12a, particularly, the attaching surface of the FPC 60, that is, the interval between the attaching surface and the lowermost surface ML is decided in consideration of the space merely for the thickness of the FPC 60, and it can be set to about 0.5 mm. Further, in the region, the interval is reduced, that is, by a depth of the recess 50 of 0.6 mm, the outer surface of the bottom wall 12a can be lowered.

According to the HDD of the first embodiment configured as above, the second end portion 60b of the FPC 60 is disposed in the recess 50 formed in the outer surface of the bottom wall 12a and further the adhesive AD for the overcoat is filled in the recess 50. With this configuration, the bulging portion of the adhesive AD never exceeds the lowermost surface ML of the base 12, thus making it possible to prevent wobbling of the HDD when placed horizontally or the height of the device from exceeding the value of the specification. Further, by the depth of the recess 50, the outer surface of the bottom wall 12a can be lowered and the height position of the disk attaching surface 72 of the flange 65 can be lowered. Thus, the number of magnetic disks to be loaded and the interval between magnetic disks can be increased, and thus an HDD in which ten or more magnetic disks are loadable can be obtained.

The thickness T1 of the bottom wall 12a of the region (opposing region) opposing the flange 65 can be maintained as the same thickness as conventional techniques, and therefore the castability of the base 12 is not adversely affected. Thus, it is possible to cast a high-quality base 12 in which extremely few casting cavities, which can give rise to leak paths and can endure the sealing of helium for a long time.

Further, in the embodiment, the step 54 is formed into an inclined slope, and thus both effects of smooth attachment of the FPC 60 and the prevention of excessive spreading of the adhesive AD can be obtained at the same time.

Next, an HDD according to another embodiment will be described. In this embodiment provided below, portions equivalent to those of the first embodiment are denoted by the same reference numbers and detailed explanations thereof will be omitted or simplified, and such explanations will be mainly provided for portions different from those of the first embodiment.

Second Embodiment

Figure 5:
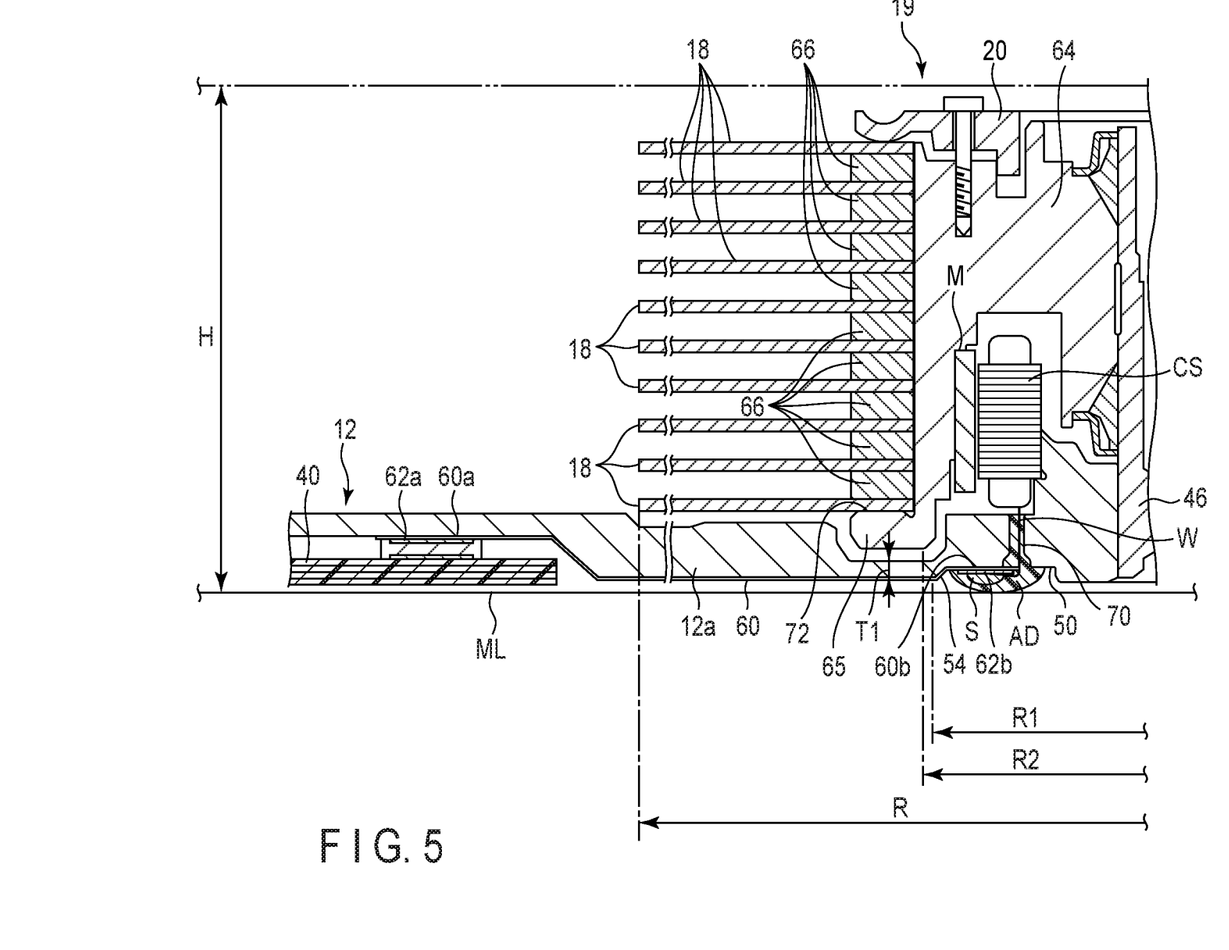
FIG. 5 is a cross section of an HDD according to the second embodiment.

FIG. 5 is a cross section of an HDD according to the second embodiment.

In the second embodiment, as shown in FIG. 5, the height of the outer surface of the bottom wall 12a is set similar to that of the first embodiment and the thickness T1 of the bottom wall 12a is set unchanged to 1.1 mm, which is similar to that of the conventional techniques when casting. Further, in the inner surface of the bottom wall 12a, the region opposing the flange 65 is cut by 0.3 mm, and thus the thickness T1 of the bottom wall 12a is set to about 0.8 mm. In place, the installation position of the flange 65 is lowered to the bottom wall 12a side so as to decrease the height of the disk mounting surface 72 of the flange 65 by 0.9 mm.

Here, the height (interval) from the lowermost surface ML of the base 12 to the disk mounting surface 72 is 3.7 mm or less, for example, 3.655 mm.

In the second embodiment as well, the printed circuit board 40 is formed and disposed in a similar manner as that of the first embodiment. That is, the printed circuit board 40 is formed to have a size of about ¼ to ⅓ of the area of the bottom wall 12a and is provided in a region which does not overlap the region opposing the respective magnetic disk 18 and the region opposing the movable region of the actuator assembly 22, that is, the region of the outer surface of the bottom wall 12a, which is off of these regions. Further, in the embodiment, the printed circuit board 40 is disposed to be overlaid on the recess formed in the outer surface of the bottom wall 12a.

In the HDD of the above-described configuration, the thickness of the bottom wall 12a when casting the base 12 is same as that of the conventional technique, that is, 1.1 mm, and therefore castability equivalent to that of the conventional technique is maintained. When assuming the thickness of the flange 65 and the interval between the flange 65 and the bottom wall 12a are equivalent to those of the conventional HDD, the height position of the disk attaching surface 72 of the flange 65 can be lowered by 0.9 mm. Therefore, for the portion of 0.9 mm, the number of magnetic disks to be loaded can be increased. For example, let us suppose the case where ten 0.5 mm-thick magnetic disks and nine 1.58 mm-thick spacer rings are disposed in a multi-layered manner on the disk attaching surface 72 of the flange 65. In this case, a total thickness of the multiplayer is: 0.5×10+1.58×9=19.22 mm. Thus, ten magnetic disks can be loaded without substantially changing the height of the uppermost surface of the magnetic disk.

Note that the first end portion 60a and the first contact pads 62a of the FPC 60 connected to the printed circuit board 40 are disposed on an outer region of the radius R of the magnetic disk 18. Therefore, in order to lower the disk mounting surface 72 of the flange 65 by 0.9 mm, it is not necessary to form an extremely thin portion in a region of the bottom wall 12a directly under the magnetic disk 18, and thus the castability of the base 12 can be maintained.

In the embodiment, the height from the lowermost surface of the base to the lowermost surface of the disk is lowered by 0.9 mm as compared to the conventional magnetic disc devices, and therefore it is difficult to dispose the printed circuit board 40 in a region opposing the magnetic disk. Thus, in this embodiment, as described above, the printed circuit board 40 is placed in a region which does not overlap the region opposing the magnetic disk 18 and the range opposing the movable region of the actuator assembly 22. Thus, ten or more magnetic disks 18 can be loaded on the housing 10 while maintain such a thickness of the base as to satisfy the castability necessary to seal He even in the region directly under the magnetic disk.

In addition, in the second embodiment as well, advantageous operational effects similar to those of the above-described first embodiment can be obtained.

First Modified Example

With reference to FIG. 5, the first modified example of the second embodiment will be described. According to the first modified example, the mechanical processing amount of the region of the bottom wall 12a opposing the flange 65 is increased by 0.1 mm, and the thickness of the bottom wall 12a after the processing is 0.7 mm. The internal between the flange 65 and the bottom wall 12a is reduced to 0.4 to 0.25 mm. Further, the thickness of the flange 65 is reduced to 1.92 to 1.72 mm. Thus, the height position of the disk mounting surface 72 of the flange 65 can be lowered by 1.35 mm. The height (interval) from the lowermost surface ML of the base 12 to the disk mounting surface 72 is 3.7 mm or lower, for example, 3.17 mm.

In the first modified example, for example, let us suppose the case where ten 0.635 mm-thick magnetic disks and nine 1.488 mm-thick spacer rings are disposed in a multi-layered manner on the disk attaching surface 72 of the flange 65. In this case, a total thickness of the multiplayer is: 0.635×10+ 1.484×9=19.706 mm. Thus, ten magnetic disks 18 can be loaded without substantially changing the height of the uppermost surface of the magnetic disk.

While certain embodiments or modifications have been described, these embodiments or modifications have been presented by way of example only, and are not intended to limit the scope of the inventions. Indeed, the novel embodiments and modifications described herein may be embodied in a variety of other forms; furthermore, various omissions, substitutions and changes in the form of the embodiments and modifications described herein may be made without departing from the spirit of the inventions. The accompanying claims and their equivalents are intended to cover such forms or modifications as would fall within the scope and spirit of the inventions.

In the embodiments and the modified example, described above, the number of magnetic disks to be loaded is not limited to ten, but may be eleven or more. The thickness of the magnetic disk is not limited to 0.635 mm or 0.5 mm, but may be variously changed as needed. Similarly, the diameter of the magnetic disks is not limited to 96 mm, but may be, for example, 95 mm or 97 mm. The number of through holes which pass the lead wires of the stator coil is not limited to four but may be three or less. The abutting surface of the boss portion 52 is not limited to a processing surface, but may be partially or entirely casting surface. The adhesive is not limited to one type, but two or more types of adhesives may be compositely used. For example, such a structure may be adopted that a highly sealing adhesive is filled in the through holes 70 and some other type of adhesive is applied to the recess 50.

What is claimed is:

1. A disk device comprising:
a housing comprising a base including a bottom wall and a cover fixed to the base;
a motor comprising a shaft provided on the bottom wall, a hub including an outer circumferential surface coaxial with the shaft and an annular flange provided on the outer circumferential surface, and rotatably supported on the shaft, and a coil provided around the shaft;
a plurality of magnetic disks attached to the hub to overlap the flange;
a head actuator supporting a plurality of magnetic heads and installed rotatably in the housing;
a printed circuit board disposed to oppose an outer surface of the bottom wall and provided in a position opposing a region outside an outer circumferential edge of the magnetic disks; and
a wiring board attached on the outer surface of the bottom wall and electrically connected to the printed circuit board and the coil,
the bottom wall including a recess formed in the outer surface to oppose a region between an inner circumferential edge of the flange and the shaft, a step located on a border between the outer surface and the recess, and through holes each formed to penetrate the bottom wall and opened to the recess,
the wiring board including one end portion disposed in the recess, a plurality of connection pads provided on the one end portion, an other end portion opposing the region outside the outer circumferential edge of the magnetic disks, and a plurality of connection pads provided on the other end portion, the other end portion and the connection pads being joined to the printed circuit board,
the coil including lead wires drawn out in the recess via the through holes, and joined to the connection pads by soldering, and
an adhesive filled into the recess and the through holes, covering the one end portion and a solder joint, and sealing the through holes.

2. The disk device of claim 1, wherein
the flange includes an annular disk-mounting surface on which the magnetic disks are placed, and
a height from a lowermost surface of the base to the disk-mounting surface is 3.7 mm or less.

3. The disk device of claim 1, wherein a depth of the recess is 0.5 mm or more but 0.7 mm or less.

4. The disk device of claim 1, wherein the step is formed into a slope inclined to a direction perpendicular to the outer surface of the bottom wall.

5. The disk device of claim 1, wherein ten magnetic disks of a thickness of 0.635 mm and a diameter of 3.5 inches are stacked on the flange, and supported by the hub.

6. The disk device of claim 1, wherein a low-density gas having a density lower than that of air is enclosed in the housing.

7. The disk device of claim 1, wherein the flange includes an annular disk-mounting surface on which the magnetic disks are placed, and a height from a lowermost surface of the base to the disk-mounting surface is 3.2 mm or less.

8. The disk device of claim 1, wherein the adhesive contains two or more kinds of adhesives.

9. The disk device of claim 1, wherein the housing has a height of 26.1 mm at maximum or lower defined by a standard of 3.5-inch disk devices.

* * * * *